UNITED STATES PATENT OFFICE.

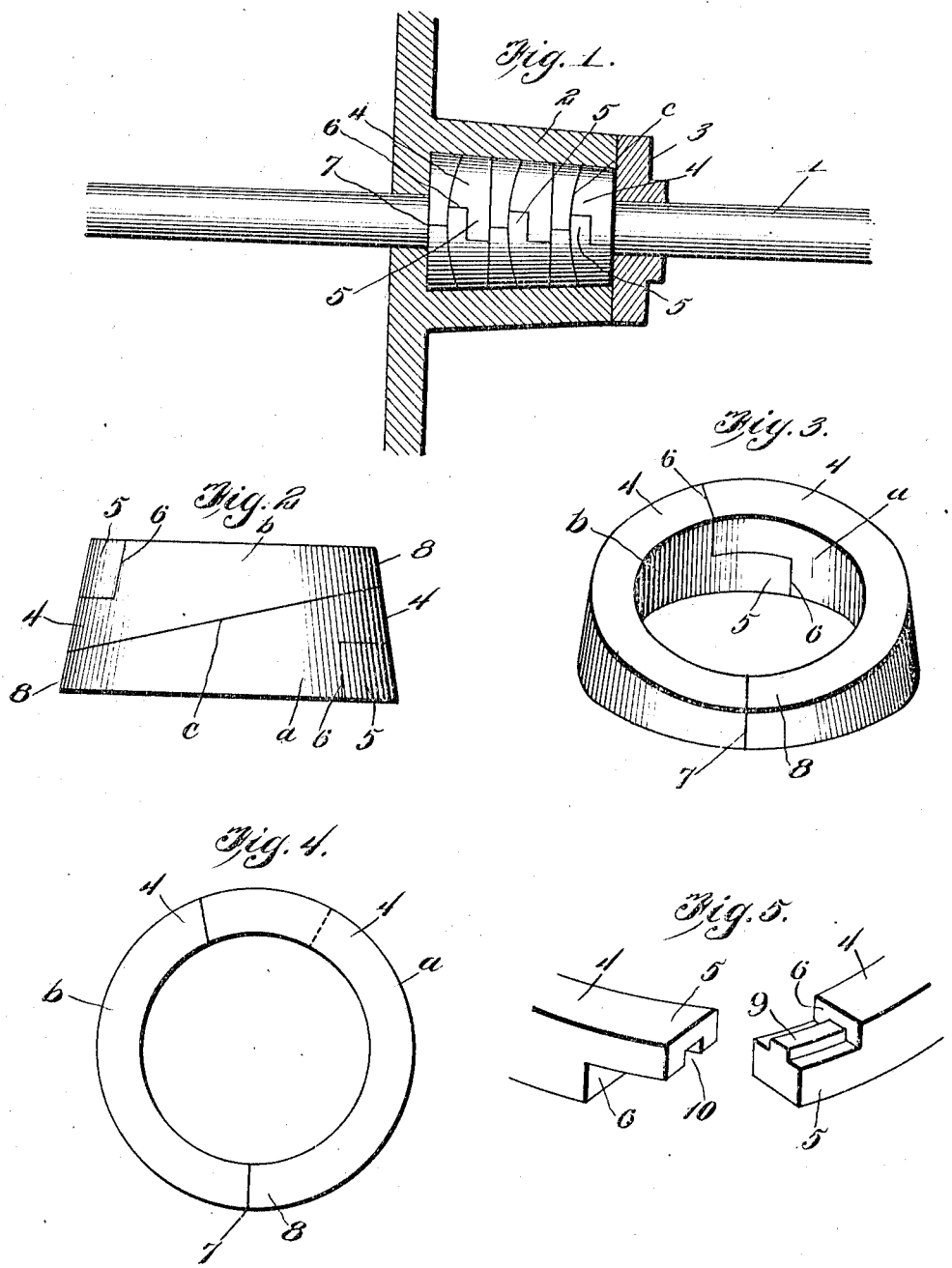

WILLIAM B. SHULL, OF GOODLAND, KANSAS.

SELF-ADJUSTING METALLIC PACKING.

990,017.

Specification of Letters Patent. Patented Apr. 18, 1911.

Application filed February 8, 1911. Serial No. 607,240.

*To all whom it may concern:*

Be it known that I, WILLIAM B. SHULL, a citizen of the United States, residing at Goodland, in the county of Sherman and State of Kansas, have invented certain new and useful Improvements in Self-Adjusting Metallic Packing, of which the following is a specification.

This invention relates to self-adjusting metallic packing for piston rods and one of the principal objects of the invention is to provide a packing which can be readily placed upon the rod within a stuffing box or casing without disconnecting the rod from its adjacent parts, said packing comprising two or more sectional rings of Babbitt metal or similar material, said sectional rings being divided diagonally to provide a thin and a thick portion lying adjacent one to the other and the ends of the ring sections being overlapped so as to permit self-adjustment of the ring sections to compensate for wear and to always provide a steam tight joint.

Another object of the invention is to provide a rod packing for pistons, valves or other structures requiring a steam tight joint between the rod and the stuffing box or casing, said packing comprising a series of metal rings, each ring comprising two sections and having a sliding connection at one end to permit expansion and contraction within certain limits, said ring sections each having a thick and a thin portion and the adjacent ring being disposed reversely so that the thick portion is disposed in alinement with the thin portion.

Still another object of the invention is to provide a self-adjusting metallic packing for rods which will compensate for wear and which will provide a steam tight joint between the rod and the casing and which will expand and contract within certain limits to prevent leakage.

These and other objects may be attained by means of the construction illustrated in the accompanying drawing, in which:

Figure 1 is a side elevation of a rod extending through a casing or stuffing box shown in section with the metallic packing placed upon the rod within the casing. Fig. 2 is a side elevation of a pair of the sectional rings placed in operative position. Fig. 3 is a perspective view of one of the rings. Fig. 4 is a plan view of the same. Fig. 5 is a detailed perspective view showing a sliding lap joint which may be utilized in connecting the ring sections.

Referring to Fig. 1 of the drawing, the numeral 1 designates a rod which may be a piston rod, a valve rod or a reciprocating rod extending through a casing or stuffing box 2 provided with a suitable cover 3.

In carrying out my invention, I make use of as many sectional rings as may be required for different purposes, said rings being so formed that they will readily adjust themselves to form a steam tight fitting.

Referring to Figs. 2 and 3, it is to be noted that each of the sections $a$ and $b$ of the packing is provided with a thick and a thin portion, the thick portion 4 of the section having a lap joint comprising an extended tongue 5 and an abrupt shoulder 6. The thinner portion may be provided with an ordinary butt joint 7. When two or more of these rings made up of two sections are placed together as shown in Figs. 1 and 2, the thick portion 4 of one ring lies adjacent to the thin portion of the adjacent ring.

Referring to Fig. 5, it will be seen that the lap joint at the ends of the ring sections are provided with a tongue and groove connection, one of the sections being provided with a tongue 9 and the other with a coacting groove 10, thus permitting the parts to expand readily without getting out of alinement one with the other.

From the foregoing it will be obvious that a metal packing made in accordance with my invention may be readily placed upon the rod without disconnection of the parts by placing the two sections upon opposite sides of the rod and matching them together. It will also be obvious that any number of these ring sections may be placed in proper relative position and that owing to the tapering structure of the rings which are divided by the diagonal line $c$ any number of these sections may be utilized and that they will all become self-adjusting and will compensate for wear of the parts.

My invention can be manufactured at comparatively low cost, will result in considerable saving of time and expense in repacking, and can be readily placed in position upon the rod without disconnection of the parts.

I claim:

A metallic packing comprising a plurality of ring sections, said ring sections being divided by a diagonal line so that the thicker portion of one ring will lie adjacent to the thinner portion of the next adjacent ring, said rings being made in sections having overlapping joints.

In testimony whereof I affix my signature in presence of two witnesses.

WILLIAM B. SHULL.

Witnesses:
R. L. KENT,
G. W. JOHNSTON.